Patented Oct. 27, 1942

2,299,768

UNITED STATES PATENT OFFICE 2,299,768

TREATMENT OF SOLID CONTACT MASSES

Hubert A. Shabaker, Media, Pa., assignor to Houdry Process Corporation, Wilmington, Del., a corporation of Delaware No Drawing. Application May 20, 1938, Serial No. 209,070

15 Claims. (Cl. 252—259)

The present invention relates to treatment of dried colloids to improve and extend their value as commercial products for industrial and other uses. More particularly, it is concerned with processing in dry form of gels, gelatinous precipitates and the like, which are converted by drying into permanent hard masses which are usually amorphous and often vitreous in nature.

Because of the high adsorptive capacity and easily controlled characteristics including composition and purity of products made from synthetic jellies, hydrogels and gelatinous precipitates, materials of this class have for some time been considered valuable as starting materials in the production of contact masses intended for widely diversified uses. For many uses, including fluid contacting operations wherein a contact mass enters into, promotes or in any way assists chemical and/or physical changes in the fluid undergoing treatment, it has long been recognized that important advantages are realized when the contact mass is presented as discrete pieces of predetermined size and uniform shape.

Many methods for forming or molding gels and the like have been proposed involving supplying wet gel, dried gel or both to the forming or molding step. The gelatinous nature of the wet gel, jelly or the like makes this type of material extremely difficult and expensive to handle during the washing and other steps preparatory to the forming operation. Furthermore, in many instances, formed pieces comprising or containing jelly are so tender immediately after their production that extreme care must be exercised in the handling of these pieces during their subsequent treatment in order that they may retain the desired shape. For these and other reasons it is preferable and economically advantageous to use gels which have first been dried as starting materials for forming or molding processes. Since dried gels and the like, when wetted, have been known to form heterogeneous mixtures with the wetting agent, which do not slime, swell, develop "slip," become sticky or exhibit other characteristics indicative of plasticity or the ability to form strong coherent pieces of predetermined size and regular shape, it has heretofore been considered necessary to form or mold such dried materials with the aid of an added plasticising, cementing or binding agent.

One object of the present invention is to devise a simple and economical process for preparing dried colloids for forming or molding. Another object is to form dried gel and the like while avoiding the addition of plasticizing, cementing or binding agents. Another object is to provide formed contact masses having improved strength and other valuable properties. Another object is to modify the preparation procedure in response to differences in the characteristics of the starting material to meet specified values for strength of the formed or molded product. Other objects will be apparent from the detailed description which follows.

The invention involves simple mechanical treatment of finely divided dried colloids such as gels or gelatinous precipitates in the presence of predetermined amounts of a wetting agent or material which wets the surface of the dried colloids. Contrary to expectation, the surprising and important discovery has been made that simple mixing or agitating treatment, such as kneading, mulling, grinding and the like of finely divided dried gel in the presence of regulated quantities of a simple wetting material, for example, water, when carried to determinable extent beyond that necessary for effecting uniform distribution of the wetting agent through the solid material, produces a heterogeneous mixture having particular and peculiar properties which make it valuable for shaping or molding.

Upon following conditions essential to successful practice of the invention the mechanical treatment produces a heterogeneous gritty, abrasive and short semi-fluid mixture having controlled and predetermined viscosity. This mixture has the characteristic and peculiar ability repeatedly and reversibly to assume alternate physical forms, namely that of a coherent, stiff, body of definite and permanent shape and that of a mobile semi-fluid until a substantial portion of the wetting agent has been removed, as by drying. In its semi-fluid state the mixture sets to the stiff and often solid or non-flowable form upon standing. In this condition it is usually crumbly or short and is sometimes hard and brittle. Upon agitation, such as simple working or stirring or even gentle shaking, this non-plastic, coherent, body rapidly reverts to its original mobile or flowable condition. This property is pronounced even when the mixture in its semi-fluid and wet state is mobile enough to be adapted for flowing into casting molds and the like. In fact, this property makes the heterogeneous mixture peculiarly and admirably suited for casting operations.

The conditions for making the above described particular and peculiar heterogeneous mixture are:

1. The dried gel or gelatinous precipitate, preferably washed free or substantially free of salts and the like, must be in finely divided or comminuted condition, during formation of the mixture. In most instances, particles sizes at least as fine as or finer than 80 or 100 mesh are necessary, the tendency being toward higher strength of the finished product with finer division of the solid in the mixture. Drying of the wet gelatinous source material may be effected in any known or desired manner suitable for drying materials of this class without substantially decreasing their adsorptive capacities. This operation may be slow or rapid and may be carried to any desired stage of completion, the only requirement being that the original gel or the like be converted into a permanent solid that is sufficiently hard and otherwise adapted for an easily and economically conducted washing step. In order that the dried gel develop to full extent during mechanical treatment the property of reversing its physical form at will, it is preferred that the drying step be conducted at moderate temperatures, as up to about 400° F. Good results are obtained with low temperature drying processes wherein temperatures up to about 250° F. may be attained.

2. Enough water or other suitable wetting material must be present with the finely divided dried material to provide surface wetting in the final heterogeneous mixture in addition to satisfying the adsorptive capacity of the comminuted particles in that mixture. The amount of wetting agent necessary for producing final mixtures of desired consistency from a given dried gel varies within rather wide limits with the chemical nature, physical condition and purity of the dried gel as it is presented to the mechanical treatment but can easily be determined for a given gel by simple experiment. The viscosity or fluidity of a final heterogeneous mixture prepared from a given gel may be regulated to meet the requirements or needs of subsequent steps for treatment or disposition of the same through control of the quantity of wetting agent employed. Heterogeneous mixtures of consistencies best suited for forming or molding operations involving casting can usually be obtained when 60% to 150% by weight of water, for example, based on bone-dry colloid, is present during the mechanical treatment. For most single or plural oxide gels comprising or containing silica this type of mixture can be produced with 75% to 120% of water. When the desired mixture is to be relatively stiff, as when it is to be extruded through dies, quantities of the wetting agent within the lower portions of or below the above ranges may be used, as for example from 40% to 100% by weight of water. It is not necessary that the dried amorphous solid and the desired or required amount of wetting material be combined in any particular manner. The two materials may be introduced into the mechanical treating equipment simultaneously or in any desired order before or during the mechanical treatment so long as they are present in the proper quantities during formation of the final heterogeneous mixture.

3. Mechanical treatment of the contacted or combined dried colloid and wetting agent in their predetermined and proper proportions must be conducted, beyond the point necessary for simple mixing, until the heterogeneous mixture develops the above described peculiar property. The development of this property is usually accompanied by visually perceptible rapid and substantial increase in the apparent fluidity of the combined liquid and solid. When a substantial proportion of the dried colloid is added during the latter portions of the treating time this thinning is sometimes more gradual and not so easily apparent on casual inspection. But, in any event, the mechanical treatment must produce a heterogeneous mixture capable of thickening to coherent stiff or solid form upon standing and of subsequently thinning to mobile, semi-fluid state when subjected to mild mechanical treatment. The time elapsed before this change or break takes place varies between rather wide limits as from 10 minutes to several hours, depending upon the physical and chemical nature of the gel and on the particular type of treatment. Generally speaking, for a given dried gel the time of treatment is shorter the more vigorous the mechanical treatment and/or the more finely divided the dried solid starting material. This time tends to vary and/or the change in the consistency of the mixture becomes more or less pronounced with increasing quantities of impurities, such as acid or alkaline reacting substances or salts, in the dried gel. Many if not most dried silicious gels, of which the amorphous, hard, vitreous (glassy or porcelanic) gels comprising silica alone or mixed with other oxides such as the oxides of alumina, iron, tungsten, nickel, copper etc. may be considered typical, when presented to mechanical treatment providing reasonably efficient kneading action, for example a mulling treatment or the like, as particles of 100 mesh size or finer are converted into the desired heterogeneous mixture within a treating period of 15 to 60 minutes. When the mechanical treatment involves grinding action, as when utilizing a ball, colloid or rod mill, the particles of dried gel starting material may be of any desired size, compensating adjustment being made in the treating time.

When the heterogeneous mixture is to be subjected to a molding operation, it is desirable to agitate the mixture prior to the molding step to insure the desired or required degree of fluidity for that operation. In some plants, as when the heterogeneous mixture is fed directly to a molding or other forming operation, it is desirable and often necessary in the interests of plant economy and efficiency to keep the mixture in a constant state of agitation up to the actual molding step. Such agitation, in most instances, need not be violent, since gentle stirring of the mixture is usually sufficient. In some cases, vibration or jolting of the receptacle containing the heterogeneous mixture serves to prevent the latter from being transformed into its stiff and coherent state. When extrusion is the chosen method of molding the pressure obtained in the chamber behind the die plate or plates coupled with the use of a judicious quantity of a suitable lubricant, such as certain organic compounds or emulsions containing carbohydrates or fatty substances or a distillate or residual hydrocarbon fraction, usually provides an acceptable operation. Although extrusion, pressing and other molding methods may be used, the heterogeneous mixture is particularly well adapted for casting operations by virtue of its characteristic property of controllably assuming semi-fluid and stiff or solid forms. In its semi-fluid condition it lends itself readily for flowing into casting molds; in the latter it rapidly forms a coherent body which is not easily dislodged upon handling or inversion of the mold.

Low or moderate temperature drying of the formed heterogeneous mixture yields a tough, hard product which, in many instances, is suitable for use directly in commercial scale contacting operations. This product is always a heterogeneous coherent mass of small particles of the dried colloid. With certain gels, as for example, many blends of silica and another oxide such as alumina, this product is often substantially stronger than molded products of similar size and shape produced from many clays under molding and drying conditions designed to develop tough, strong products from hydrosilicates of alumina. Molded pieces made according to the invention possess the valuable and important characteristic of being capable of very little shrinkage when dried at low or moderate temperatures even when the heterogeneous mixture is so thin as to be adapted for pouring. As a result, the molded pieces are not only hard and tough but also are light, porous and highly adsorptive. The degree of shrinkage may perhaps best be illustrated by the behaviour of a thin heterogeneous mixture comprising a blend of silica and alumina cast into small cylinders by pouring or gently pressing into a perforated plate. When the cast material is dried in the plate at temperatures not in excess of 400° F., as for example, at temperatures within the range of 180° F. to 250° F., the shrinkage of the cylinders may be so slight that they remain in the plate during conveying or carrying of the latter from the drying oven or equivalent but may be expelled from the plate by jarring the latter or by a simple blowing operation. If desired, the toughness and strength of the dried molded product may be still further increased by a suitable high temperature heat treatment, as for example, at temperatures up to 1100° F. or higher. Even after such drastic treatment the molded heterogeneous product undergoes only slight shrinkage, the total shrinkage for amorphous silicious gels being usually of the order of 15% to 25%. This amount compares very favorably with 50%, 60% or higher shrinkage usually encountered in drying gels and the like in gelatinous or homogeneous form. Distortion of the shaped pieces and the internal stresses often resulting from drying materials of this nature are also avoided.

Gels and the like of differing source, chemical nature and condition tend to yield products having strengths varying within wide limits. By controlled simple and special modification of the wetting agent utilized in the mechanical treatment, the strength of the finished product may be regulated or adjusted to meet predetermined and high values despite these differences. To this end, the wetting agent may comprise liquid which has been utilized to effect separate mechanical treatment of a separate portion of the same or of another dried colloid conducted in the presence of excess quantities of liquid. The strength of the finished product may be doubled, trebled or even increased five times or more by judicious choice of the nature and duration of such separate treatment and of the quantity of dried gel or the like subjected to that treatment. The latter may be the same as or similar to the treatment producing the heterogenous mixture, but, in the interests of simplicity and/or economy of operation, it preferably is of more severe or drastic nature. Good results are usually obtained when this separate treatment involves grinding action, as when it is conducted in a colloid, ball, rod mill or equivalent.

When use of the separate mechanical treatment is desired, practical and economical operation is had when only a portion of the batch of dried gel to be used in making a moldable heterogeneous mixture is separately treated for prolonged times in a ball mill or equivalent in the presence of a quantity of wetting material which will produce with the entire batch a final heterogeneous mixture of at least approximately the desired consistency. The entire discharge or only the liquid portion of it may then be mixed with the remainder of the batch prior to or during the main mechanical treating step. Since the grinding action of the separate treatment develops in the dried colloid the peculiar and valuable properties characteristic of the final heterogeneous mixture it is preferred to charge the entire discharge from the milling operation or the like to the main mechanical treatment in order to realize the highest possible yield of the final product. In general, the strength of the latter is increased with increasing severity of the nature and/or duration of the secondary treatment and with increases in the proportionate quantities of solid material subjected to that treatment. For economical commercial procedure any one or all of these factors may vary between wide limits depending upon the physical and chemical nature and upon the strength specifications for the finished product as well as upon local conditions peculiar to individual plants. Usually wet grinding of 50% or less of the dried gel starting material prior to the main mechanical treatment in a ball mill for a period of 1 to 20 hours at least doubles the strength of the formed product. For many if not most silicious gels the strength of the formed or molded contact mass is at least doubled when 5 to 20% of the dried finely divided starting material is milled for 2 to 12 hours, as for example from 4 to 8 hours.

With some dried colloids the strength of the molded heterogeneous mixture depends upon the condition of the wet gel or hydrogel in its original precipitated or coagulated form as measured by its pH value at that time. Single or plural oxide gels containing silica for example, often tend to yield finished molded or formed products of decreasing strength with decreasing pH value of the original gel. The desirability or necessity of using the separate mechanical treatment and the extent of that treatment may be predicted from the pH value of the colloid in its original or wet form. When processing silicious gels, for example, formed products having sufficient strength for use in many commercial contact operations can be obtained without use of this additional treating operation from colloids having alkaline pH values. On the other hand, it is often desirable to employ both mechanical treatments when the starting gel has a pH value on the acid side.

Typical application of the invention is indicated by the following examples:

*Example 1*

A silica-alumina gel resulting from inter reaction of sodium aluminate and sodium silicate solutions and having a controlled pH value o. about 9.6 was dried at a temperature of about 200° F., washed substantially free of contaminating material and ground to approximately 300 mesh. To this dried, finely divided, hard and vitreous material there was added approximately 120% by weight of water. These combined substances were then subjected to an efficient mulling operation for about 30 minutes, at which time a thin gritty heterogeneous mixture capable of rapidly setting to a gritty, crumbly, solid mass upon standing resulted. This mixture was kept constantly in agitation by simple stirring action until it was gently pressed into casting molds consisting of metal plates of about 4 mm. thickness and having perforations of approximately 4 mm. diameter extending through them. The heterogeneous mixture in the plates was dried at about 200° F. and the resulting hard pellets were blown out of the perforations. Each of these pellets, which were of substantially the same size as the perforations in the plates, were capable of supporting about 950 grams concentrated load applied across their axes through a knife edge. After heat treatment at about 1050° F. for about 2 hours these pellets had strength in excess of 2000 grams, measured in the same manner. The heat treated product which had shrunk only about 20% was light, porous, highly adsorptive and capable of continuous use in a multiplicity of commercial operating cycles involving alternate transformation of hydrocarbons and regeneration of the contact mass in situ by combustion of burnable deposit left thereon or therein during the conversion operation.

*Example 2*

Another and approximately neutral gel comprising a blend of silica and alumina and which resulted from the interreaction of ammonium alum and sodium silicate solutions was dried, washed substantially free of contaminating material and ground substantially as described in Example 1. To a portion of this finely divided hard vitreous material there was added about 75% by weight of water. These combined substances were subjected to an efficient mulling operation for about 60 minutes following which the resulting abrasive heterogeneous mixture in its semi-fluid form was cast into pellets, and the latter was then dried and heat treated, all substantially as set forth in Example 1. The heat treated product had shrunk less than 25% and had mechanical strength of about 1100 grams as determined by application of concentrated loads through a knife edge.

The remaining portion of the dried ground gel was divided into two parts in the ratio of about 4:1. The smaller part was charged to a ball mill to which there was added water in an amount equivalent to approximately 75% by weight of the entire portion. The ball mill was then operated for approximately 8 hours and the entire discharge from it added to the aforesaid larger part of the dried ground gel. This mixture was then subjected to a mulling operation for about 60 minutes and the resulting thin gritty heterogeneous mixture was molded, dried and heat treated substantially as described above to produce pellets which had shrunk less than 25% and which were capable of supporting concentrated loads of about 2300 grams.

It is evident from the above that wet grinding of only 20% of the dried gel and utilization of the liquid discharged from the grinding step as part of the wetting agent for the mechanical treating step yielded a final product of more than double strength. The increased strength was gained at no sacrifice of other valuable properties of the contact mass including porosity, adsorptive capacity and lightness.

*Example 3*

A silica hydrogel having a pH value below 6 was dried at low temperature, washed, and the resulting hard, horny, glassy gel was ground to smaller than 100 mesh. The resulting finely divided amorphous solid was divided into two parts in the approximate ratio of 1½:1. The smaller of these parts was then ground in a ball mill along with water equivalent to about 85% by weight of the entire finely divided dried gel for about 20 hours. At the end of this period the entire discharge from the ball mill was mixed with the aforesaid larger part and then mulled for approximately 60 minutes. The resulting gritty heterogeneous semi-fluid was cast into cylindrical pellets having a size of about 4 mm. x 4 mm. These pellets after being dried and heat treated substantially as described in Examples 1 and 2 had shrunk about 15% and were capable of resisting concentrated loads in excess of 1000 grams.

The gritty and abrasive heterogeneous mixtures obtained in each of the above examples rapidly set to coherent bodies of definite and permanent shape upon standing. When agitated these solids were readily converted to viscous, flowable, semi-fluid condition. After being flowed into the perforated plates utilized for casting molds the resulting pellets rapidly assumed such stiff form that they were entirely self-supporting within the perforations a few seconds after the flowing step. No additional support to prevent dislodging of the pellets was necessary during handling of the plates for process purposes, as for example, conveyance to and through the drying equipment. In addition to these advantages, the reversible heterogeneous mixture provides for process economies and for prevention of losses of material during normal and abnormal operating conditions. For example, excess mixture wiped or otherwise removed from overfull casting molds needs only to be agitated before being recharged to the casting equipment in flowable form capable of yielding strong valuable molded products. Likewise, heterogeneous mixture in bulk or molded form which may accumulate as the result of spillage, faulty molding procedure or during temporary shutdowns for adjustment, modification or repairs to molding, conveying or drying equipment requires no more reprocessing than simple agitation to return to it flowable condition adapted for immediate molding.

For certain contact operations it is sometimes desirable to add to or incorporate within the formed or molded product controlled amounts of material of inert or active nature, including metals, metal oxides or other compounds having chemical or catalytic activity and inert diluents, for example, organic or other fillers capable of subsequent removal by combustion or leaching. Active ingredients may be added in wet or dry form to the wetting agent or to the dried gel before or during mechanical treatment, or such material may be added to the formed or molded product, as for example, by dipping the latter into a solution containing or capable of forming the desired additional ingredient. Inactive substances may be added in any known or desired manner at any time prior to the forming step.

The invention finds application in the production of a multiplicity of greatly diversified contact masses capable of use in many processes, including the decomposition of low and high boiling hydrocarbons, the controlled oxidation and hydrogenation of hydrocarbons or their derivatives, the purification of gases involving chemical reaction between the contact mass and constituents of the gases and/or selective adsorptive affinity of the mass for portions of the gaseous charging material. Furthermore, these contact masses are made so as to have predetermined strengths capable of successfully withstanding extensive and continued commercial use under the operating conditions encountered in industrial scale installations.

The terms colloid, gel, jelly, gelatinous precipitate and the like whenever used herein and in the appended claims embrace materials of this class which, upon drying or removal of suspension medium therefrom, are converted into hard, permanent solids, i. e., solids which are not subject to swelling and reversion to gelatinous form or which do not slime, develop "slip," become sticky or exhibit other characteristics of plasticity upon simple contact with an inert wetting agent, and exclude reversible colloids, i. e. colloids of the type which, after drying and rewetting tend to swell and revert to substantial extent to the original jelly-like mass, in which condition they are readily dispersed into homogeneous or substantially homogeneous form.

When the term "knife edge" is used herein and in the appended claims reference is made to the edge of a knife of the type commonly utilized in analytical and other precision balances for the purpose of providing bearing surface or a fulcrum.

I claim as my invention:

1. In the production of molded contact masses from precipitated irreversible inorganic gels the steps of subjecting such gel to conditions including drying which produce finely divided, hard, permanent solid, wetting said solid with added water free of gelatinous material, said water being added in quantity regulated to produce a mix which upon subsequent treatment has consistency suitable for molding, effecting said treatment by working the solid and added water for time sufficient to produce a flowable heterogeneous mass which reversibly increases and decreases in consistency upon standing and being agitated, respectively, and molding said heterogeneous mass while in its condition of decreased consistency into pieces of predetermined size and shape.

2. In the production of molded contact masses from precipitated inorganic gelatinous material, the steps comprising subjecting such material to conditions including drying which produce dry, hard, finely divided permanent solid, mixing said solid and added water in amount controlled to yield a mixture which upon subsequent treatment has consistency suitable for flowing into casting molds, effecting said treatment by working the mixture until a gritty heterogeneous mass which reversibly sets and reverts to said consistency upon standing and being subjected to agitation, respectively, is produced, casting the mass into definite forms, allowing the cast forms to set and drying the set forms to permanently harden the same.

3. In the preparation of molded contact masses the process of producing a material of moldable consistency comprising the steps of drying precipitated inorganic irreversible gel containing soluble products resulting from the gel forming reactions to produce hard, permanent solid, washing the dried gel to remove said soluble products, working a mixture of the hard permanently solid washed gel in finely divided condition and water free of gelatinous material for time sufficient to produce a gritty heterogeneous flowable mass which reversibly stiffens upon standing and regains its original flowability upon agitation, and limiting the quantity of water present in said working step to such amount that the said reversible mass has consistency suitable for molding, molding said mass into pieces of predetermined size and shape, and presenting said mass to the molding step while in its more flowable condition.

4. In the treatment of precipitated gelatinous material to produce strong molded contact masses, the process comprising subjecting such material in dried, washed, finely divided condition to mechanical treatment involving kneading action in the presence of a quantity of wetting material at least sufficient to provide surface wetting of the finely divided solid and regulated to produce a mixture of consistency suitable for flowing into casting molds, continuing said treatment beyond the point necessary for simple mixing until a viscous, gritty heterogeneous mixture of the desired consistency and capable of reversibly assuming coherent solid, and viscous, semi-fluid forms upon standing quiescent and being agitated, respectively, is produced, flowing said mixture into casting molds, and drying the cast material to produce hard, tough pieces of predetermined size and shape.

5. In the preparation of molded contact masses the process of producing a material of moldable consistency comprising the steps of drying precipitated inorganic irreversible gel containing soluble products resulting from the gel forming reactions to produce hard, premanent solid, washing the dried gel to remove said soluble products, working a mixture of the permanently solid washed gel in finely divided condition and water free of gelatinous material for time sufficient to produce a gritty, heterogeneous mass which reversibly sets upon standing and decreases in consistency upon agitation, controlling the quantity of water present in said working step to such amount within the range of 40% to 150% by weight of said dried gel that the said reversible mass has consistency suitable for molding, and molding said mass into discrete pieces of predetermined shape while in its condition of decreased consistency.

6. In the manufacture from precipitated inorganic gels of products of controlled consistency suitable for use in molding operations, the steps comprising subjecting such gel in dry, hard, finely divided form to mechanical treatment in the presence of a predetermined quantity of aqueous material that wets the surfaces of the finely divided solid until a flowable heterogeneous mixture which rapidly sets to coherent solid form is produced, and including in said wetting material liquid obtained from mechanical treatment of a separate portion of dried precipitated inorganic gel in the presence of wetting material.

7. In the treatment of precipitated inorganic, gelatinous materials to adapt them for forming operations, the steps comprising subjecting such starting material in dried, hard, permanently solid and finely divided form to mechanical treatment in the presence of a material that wets surfaces of the dried solid in quantity controlled to yield a product of moldable consistency having wet outside surfaces, continuing said mechanical treatment until a gritty, heterogeneous mixture capable of reversibly assuming coherent, stiff and flowable semi-fluid forms upon standing and being subjected to mechanical treatment, respectively, is produced, and including with said solid and said wetting material finely divided solid and liquid obtained from separate and prolonged wet mechanical treatment of a separate portion of vitreous, finely divided, precipitated inorganic gel in the presence of wetting material.

8. In the treatment of precipitated inorganic gelatinous material to produce strong molded contact masses, the process comprising mixing dry, permanently solid silicious gel in finely divided condition with a quantity of aqueous liquid controlled to produce a mixture which upon subsequent treatment has consistency suitable for flowing into casting molds, effecting said treatment by working the mixture until a gritty heterogeneous mass of the desired consistency which reversibly stiffens and reverts to said consistency upon standing quiescent and being agitated, respectively, is produced, flowing said mass into casting molds, and drying the cast material.

9. The process of manufacturing molded contact masses comprising the steps of subjecting a plural oxide gel containing silica to conditions including drying which produce dry, hard finely divided permanent solid, mixing said solid and added water in amounts controlled to yield a mixture which upon subsequent treatment has consistency suitable for flowing into casting molds, effecting said treatment by working the mixture until a gritty heterogeneous mass which reversibly sets and regains original consistency upon standing and agitation, respectively, is produced, casting the treated mass to produce molded units of predetermined size and shape, and drying the cast units to harden the same.

10. In the preparation of molded contact masses the steps of subjecting precipitated silicious gel to conditions including drying which produce dry, hard, finely divided permanent solid, adding to the permanent solid water free of gelatinous material, said water being added in amount not in excess of 120% by weight of dry gel but sufficient to produce a mix which upon subsequent treatment has consistency suitable for molding, effecting said treatment by working the solid and added water for time sufficient to produce a gritty, heterogeneous mass of desired moldable consistency which reversibly sets and decreases consistency upon standing and being subjected to agitation, respectively, and molding said mass into a plurality of pieces of predetermined size and shape while said mass is in its condition of decreased consistency.

11. In producing contact masses from precipitated silicious gelatinous material, the steps comprising drying such materials to produce dry, vitreous, hard solid, washing said solid and reducing the same to finely divided condition at least as small as 80 mesh, subjecting the resulting powder to mechanical treatment in the presence of a quantity of water at least 60% by weight of said solid, controlled to produce a mixture of consistency suitable for flowing into casting molds, continuing said treatment beyond the point necessary for simple mixing until substantial thinning of the mixture occurs and a gritty semi-fluid heterogeneous mixture of the desired consistency capable of setting upon standing to a coherent, stiff body is produced, casting the mixture in semi-fluid condition, and drying the cast mixture to harden the same.

12. In producing molded contact masses from precipitated silicious gelatinous material, the steps comprising drying such material to produce vitreous, hard solid, washing said solid and reducing the same to finely divided condition at least as small as 100 mesh, subjecting the resulting powder to mechanical treatment in the presence of 60% to 150% by weight of water, continuing said treatment beyond the point necessary for simple mixing until substantial thinning of the mixture occurs and a gritty semi-fluid heterogeneous mixture having consistency suitable for flowing into casting molds and capable of reversibly thickening to a coherent, stiff body of definite shape upon standing and of thinning to viscous, semi-fluid form upon being subjected to agitation is produced, flowing said mixture into casting molds, drying the cast mixture and agitating said mixture prior to introduction into said molds to regulate the consistency of said mixture for said molding step.

13. In the treatment of precipitated inorganic gelatinous material to yield commercially valuable products, the steps comprising drying, washing and reducing such material to finely divided form to produce hard comminuted, vitreous solid, dividing said solid into two portions, subjecting one of said portions to mechanical treatment in the presence of material that wets the surface of the particles in said portion in quantity regulated to yield a product of moldable consistency, continuing said treatment beyond the point necessary for simple mixing until substantial thinning of the mixture occurs and a gritty, flowable heterogeneous mixture of desired consistency capable of reversibly assuming a coherent, stiff body of definite shape upon standing and gritty, semi-fluid form upon being agitated is produced, subjecting the other of said portions to extensive and separate mechanical treatment of a more drastic nature than said first named mechanical treatment in the presence of sufficient quantity of wetting material to produce separable liquid and solid phases in the treated mixture, and utilizing wetting material from said separate mechanical treatment as at least part of said regulated quantity of wetting material employed in the first named mechanical treating step.

14. In the treatment of precipitated inorganic gelatinous material to yield commercially valuable products, the steps comprising drying, washing and reducing such starting material to finely divided form to produce hard comminuted vitreous solid, dividing said solid into two portions, subjecting one of said portions representing no more than 50% of said solid to prolonged grinding in the presence of a quantity of water substantially in excess of the adsorptive capacity of said portion, adding liquid and powder resulting from said grinding step to the other portion of said solid, subjecting the resulting mixture to mechanical treatment, in the presence of 40% to 150% by weight of aqueous wetting material including said added liquid, and continuing said treatment until substantial change in th. fluidity of the mixture takes place and the latter is converted into a gritty, semi-fluid heterogeneous form adapted for molding and capable of reversibly changing to coherent, non-fluid state and viscous semi-fluid state upon standing quiescent and being agitated, respectively.

15. In the production of molded contact masses, the steps comprising reducing dried precipitated silicious gelatinous material to 100 mesh size and/or finer, separating 5% to 50% of the resulting hard, vitreous powder from the balance of the dried material, subjecting the separated portion to prolonged grinding in the presence of water in an amount equivalent to 40% to 150% by weight of the total quantity of dry powder, adding substantially all the water and ground solid resulting from said grinding step to the remaining portion of powder, subjecting the resulting mixture to mechanical treatment until an abrasive, semi-fluid heterogeneous mixture capable of rapidly setting upon standing to coherent, solid form is produced, and molding said mixture in its semi-fluid condition to produce pieces of predetermined size and shape.

HUBERT A. SHABAKER.